(12) United States Patent
Davies

(10) Patent No.: US 9,914,277 B2
(45) Date of Patent: Mar. 13, 2018

(54) ENVELOPE-OUTLINING DEVICE

(71) Applicant: Hugh Howell Davies, Peterborough (GB)

(72) Inventor: Hugh Howell Davies, Peterborough (GB)

( * ) Notice: Subject to any disclaimer, the term of this patent is extended or adjusted under 35 U.S.C. 154(b) by 157 days.

(21) Appl. No.: 14/900,342

(22) PCT Filed: Jun. 24, 2014

(86) PCT No.: PCT/GB2014/051929
§ 371 (c)(1),
(2) Date: Dec. 21, 2015

(87) PCT Pub. No.: WO2014/207451
PCT Pub. Date: Dec. 31, 2014

(65) Prior Publication Data
US 2016/0144589 A1 May 26, 2016

(30) Foreign Application Priority Data

Jun. 27, 2013 (GB) .................................. 1311454.1

(51) Int. Cl.
*B31B 47/00* (2006.01)
*B43L 7/14* (2006.01)
*G01B 5/20* (2006.01)
*B31B 50/99* (2017.01)
*B31B 150/00* (2017.01)
*B31B 160/10* (2017.01)

(52) U.S. Cl.
CPC .............. *B31B 47/00* (2013.01); *B31B 50/99* (2017.08); *B43L 7/14* (2013.01); *G01B 5/20* (2013.01); *B31B 2150/00* (2017.08); *B31B 2160/104* (2017.08); *B31B 2247/00* (2013.01)

(58) Field of Classification Search
CPC ....................................................... B31B 47/00
USPC ............................................ 33/562, 452, 473
See application file for complete search history.

(56) References Cited

U.S. PATENT DOCUMENTS

| | | | | |
|---|---|---|---|---|
| 1,461,392 A * | 7/1923 | Ingstead | .................. | G01B 3/56 33/473 |
| 1,581,225 A * | 4/1926 | Parkhill | ................. | B27G 17/00 33/465 |
| 1,879,624 A * | 9/1932 | Lockwood | .............. | B31B 19/00 283/105 |
| 2,658,278 A * | 11/1953 | Debs | ........................ | G01B 3/02 33/27.03 |
| 4,562,649 A * | 1/1986 | Ciavarella | .............. | G01B 3/566 33/419 |
| 5,121,553 A * | 6/1992 | Boerder | ............... | B23D 59/002 33/403 |
| 5,685,816 A * | 11/1997 | Romer | .................... | B31B 19/00 493/231 |
| 6,635,003 B2 * | 10/2003 | Marchant | ............... | B43M 3/045 229/68.1 |
| 6,862,816 B1 * | 3/2005 | Romer | .................. | B42D 15/04 33/562 |

(Continued)

*Primary Examiner* — Christopher Fulton
(74) *Attorney, Agent, or Firm* — Donn K. Harms

(57) ABSTRACT

An envelope-outlining device that comprises first and second tracing members, the members being movable relative to each other. Each tracing member has a respective tracing edge, and each tracing edge has a protrusion extending from the tracing edge. A method of using the same is also disclosed.

17 Claims, 3 Drawing Sheets

(56) References Cited

U.S. PATENT DOCUMENTS

| | | | | |
|---|---|---|---|---|
| 6,978,550 B2 * | 12/2005 | Xieh | ............... | B43L 7/10 |
| | | | | 33/27.02 |
| 7,704,201 B2 * | 4/2010 | Johnson | ............ | B31B 19/00 |
| | | | | 493/240 |
| 2003/0070313 A1 * | 4/2003 | Romer | ............ | B65D 27/00 |
| | | | | 33/566 |
| 2016/0332407 A1 * | 11/2016 | Li | ............... | B44B 11/04 |

* cited by examiner

ENVELOPE-OUTLINING DEVICE

The present invention relates to an envelope-outlining device. More particularly, the present invention relates to an envelope-outlining device that is able to provide an outline for an envelope to fit a rectangular or square card of any relative dimensions.

Handmade greetings cards represent a significant proportion of all greeting cards produced and sent. Not only are such cards produced privately and non-commercially, but they are also produced commercially.

For every card produced it is necessary to have an envelope that fits the card. Typically, as envelopes are difficult to produce to different sizes greetings cards are produced in dimensions such that they will fit pre-existing envelopes. This is in contrast to making a greetings card of any desired shape and then providing the card with a bespoke envelope.

It would be desirable if greetings cards could be made to any shape and then a bespoke envelope readily provided for the card.

The present invention seeks to address this issue.

According to the present invention there is provided an envelope-outlining device comprising first and second tracing members, the members being movable relative to each other, and wherein each tracing member has a respective tracing edge, and each tracing edge has a protrusion extending from the tracing edge.

The provision of two tracing members, each having a tracing edge with a protrusion allows for any shape envelope to be marked out by positioning the protrusions where the corners of an envelope are required. The protrusions are adapted such that once an envelope has been outlined, envelope flaps embodied in a resultant envelope outline overlap each other once folded.

Preferably the tracing edges are substantially linear.

The provision of substantially linear tracing edges allows for neatly made envelopes to be produced.

Preferably the first and second tracing members are pivotally attached to each other. Preferably the first and second tracing members are slidably attached to each other.

By having the tracing members slidably and pivotally attached to each other the device is easy to use.

Preferably the envelope-outlining device comprises means to releasably secure the tracing members in a fixed position relative to each other.

Provision of means to releasably secure the tracing members in a fixed position relative to each other allows for a second half of an envelope outline to be easily marked out once a first half has been marked Preferably the tracing edges each have a proximal end and a distal end and each respective protrusion extends from each tracing edge at a point between the proximal and distal ends. Preferably the protrusions extend from the tracing edges at a point approximately midway between the proximal and distal ends.

By positioning the protrusions between the proximal and distal ends of the tracing edges it is possible to mark an envelope in only two moves, whereas if the protrusions were positioned at the distal end of the tracing edges it would require four moves to mark out an envelope.

Preferably the tracing members are substantially planar.

Provision of substantially planar members allows for a compact device.

Preferably each protrusion extends from the tracing edge substantially in the plane of its respective tracing member.

By having the protrusions extend in the plane of the tracing member the device is most compact.

In one embodiment a protrusion is substantially triangular in shape. Preferably both protrusions are substantially triangular in shape.

The provision of triangular protrusions is the optimal configuration as it allows for the outline to be of a size such that resulting flaps of the envelope neatly overlap each other and have crisp 90° corners once an outline has been created.

Preferably the means to releasably secure the tracing members in a fixed position relative to each other comprises a slot formed in at least one tracing member and a connecting member adapted to pass through the slot.

Provision of a slot and a connecting member allows for an easy method of connecting the halves of the device.

Preferably the slot is arcuate. Preferably the slot extends along at least a third of the length of the tracing member. Preferably the slot extends along around half the length of the tracing member.

Providing a slot along around half the length of the member allows for a good degree of flexibility in use.

Preferably both tracing members comprise a slot. Preferably both slots are arcuate.

Provision of semi-elliptical members, each having an arcuate slot allows for the members to flex between the arcuate edge and tracing edge so as to flatten the tracing edges on a surface and overcome a protruding connecting member. This assists in use of the device and uses less material in comparison to members that have a straight edge. Tracing members with this shape are also aesthetically pleasing.

According to a second aspect of the present invention there is provided a method of marking an outline of an envelope comprising the steps of:

i) marking on a sheet of material two pairs of corner markings corresponding to the four corners of a rectangular or square item to be contained in the envelope;

ii) providing an envelope-outlining device comprising first and second tracing members, means to releasably secure the tracing members in a fixed position relative to each other, wherein each tracing member has a respective tracing edge, and each tracing edge has a protrusion extending from the tracing edge;

iii) adjusting the position of the envelope outlining device such that the protrusions are positioned at a first pair of corner markings;

iv) drawing along the tracing edges part of an outline of the envelope.

Preferably the method further comprises the step of:

v) adjusting the envelope outlining device such that the protrusions lie adjacent to a second pair of corner markings;

vi) drawing along the tracing edges a further part of an outline of the envelope.

In order that the present invention may be more fully understood a specific embodiment will now be described, with reference to the accompanying drawings, of which:

Figure 1:
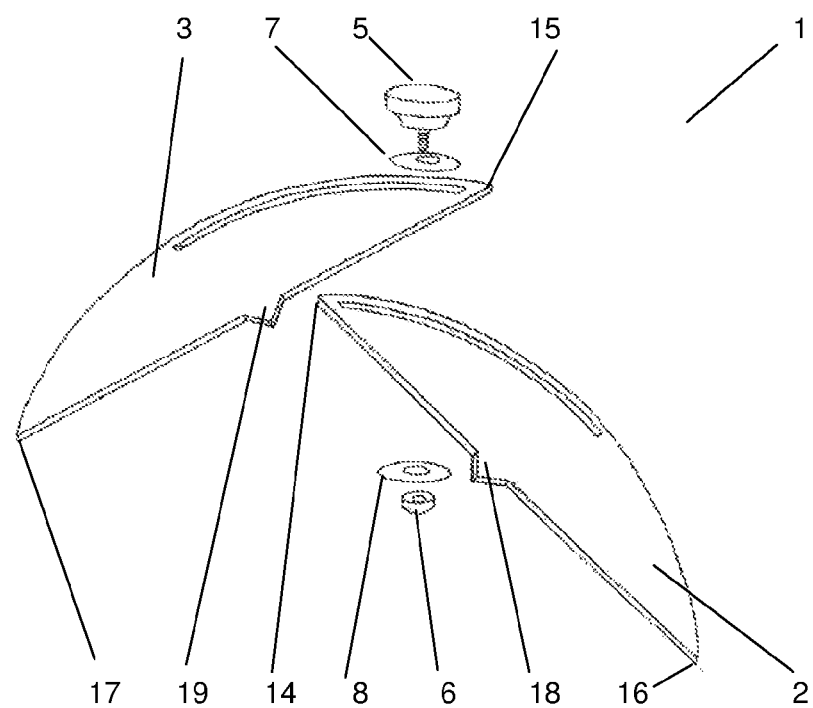
FIG. 1 is a perspective view of an envelope-outlining device made in accordance with the present invention in a disassembled state.
Figure 2:
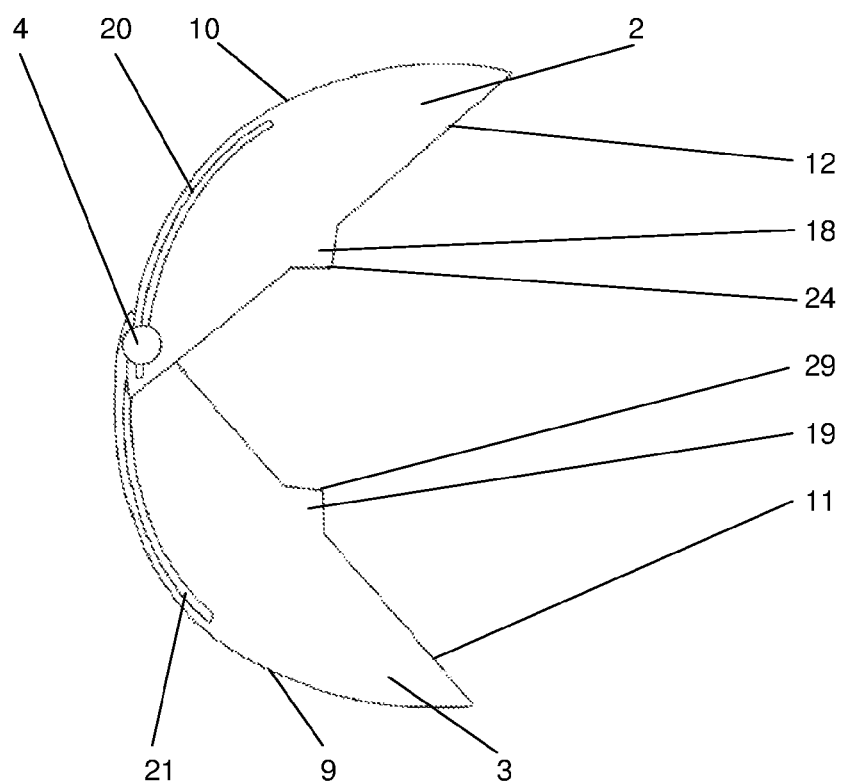
FIG. 2 is a plan view of an envelope-outlining device made in accordance with the present invention when assembled.

Referring to the drawings there is provided an envelope-outlining device 1 comprising first and second tracing members 2, 3 and nut and bolt assembly 4.

Nut and bolt assembly 4 comprises bolt 5, nut 6 and washers 7, 8. Nut and bolt assembly 4 provides means to releasably fix tracing members 2, 3 in a substantially fixed position relative to each other when envelope-outlining device 1 is in use.

Turning to tracing members 2, 3. Each tracing member is substantially semi-elliptical in shape, having an arcuate outer edge 9, 10 and a substantially linear tracing edge 11, 12.

Arcuate outer edge 9, together with substantially linear tracing edge 11 defines tracing member 3.

Arcuate outer edge 10, together with substantially linear tracing edge 12 defines tracing member 4.

Each tracing member 2, 3 comprises an arcuate slot 20, 21 adjacent to its respective arcuate edge 9, 10. Arcuate slots 20, 21 are of a width to allow bolt 5 to pass therethrough such that bolt 5 may be engaged with nut 6 such as to releasably fix tracing members 2, 3 in a substantially fixed position relative to each other.

Each tracing edge 11, 12 of each tracing member has a proximal end 14, 15 and a distal end 16, 17, and each tracing edge 11, 12 has a substantially triangular protrusion 18, 19, approximately midway between its proximal end 14, 15 and distal end 16, 17.

Figure 3:
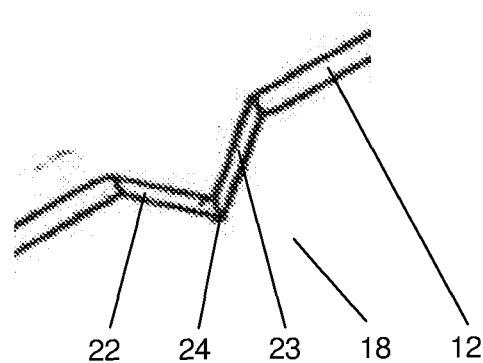
FIG. 3 is a close up view of a protrusion formed in the tracing edge of a tracing member of an envelope-outlining device made in accordance with the present invention.
Figure 4:
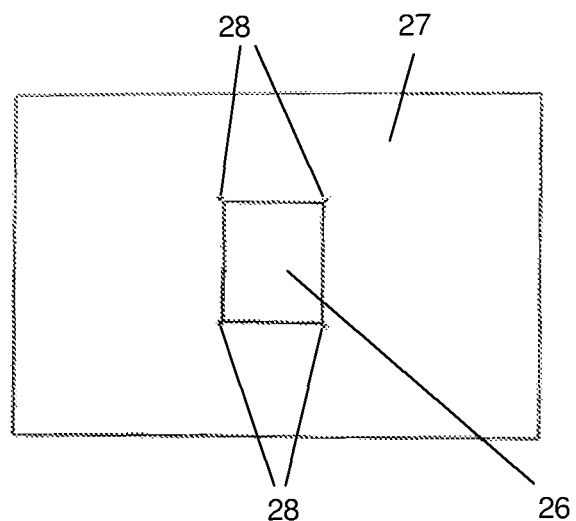
FIG. 4 is a plan view of a card on a sheet of paper to be used for making an envelope with the device of FIG. 2.
Figure 5:
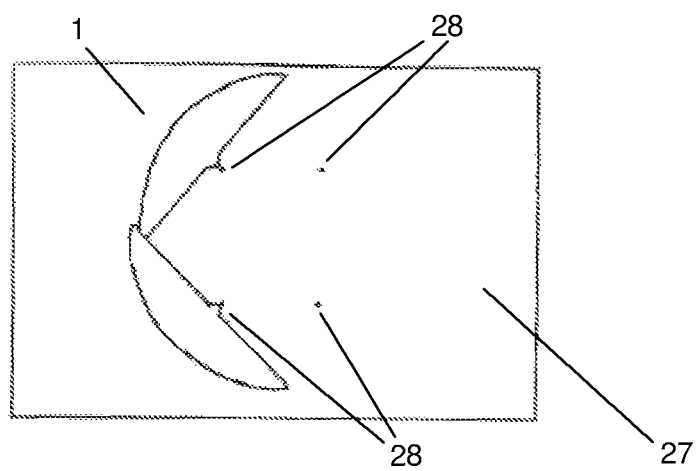
FIG. 5 is a schematic plan view of the device of FIG. 2 in use in a first position.

Turning to FIG. 3, which shows a single protrusion, 18, it can be seen that protrusion 18 comprises first edge 22 and second edge 23. First edge 22 meets tracing edge 12 at an angle of approximately 40°. Similarly, second edge 23 meets tracing edge 12 at an angle of approximately 40°. First edge 22 and second edge 23 meet at vertex 24 of protrusion 18 at an angle of approximately 100°.

Protrusion 19 is of a corresponding configuration to protrusion 18, comprising a corresponding vertex 29.

Turning to envelope-outlining device 1 in use, and referring to FIGS. 3 to 7, envelope-outlining device 1 is adapted so as to be able to readily create a bespoke envelope for a rectangular or square card of any relative dimensions (provided that the card is not so large in size as to require a larger envelope-outlining device).

In order to produce an outline 25 of an envelope for a card 26 from a sheet of material 27, card 26 is first positioned on material 27 and corner markings 28 are marked on material 27.

Envelope-outlining device 1 is adjusted such that vertices 24, 29 of protrusions are of a distance apart such that they may lie on a first pair of corner markings 28. Tracing members 2, 3 of envelope-outlining device 1 are secured in a substantially fixed position relative to each other using nut and bolt assembly 4.

Envelope-outlining device 1 is positioned with vertices 24, 29 of protrusions located on a first pair of corner markings 28.

A first half 30 of envelope outline 25 is then marked on material 27 using any suitable implement such as a pen or pencil. By tracing the full length of tracing edges 11, 12 (i.e. from where respective tracing edges 11, 12 meet adjacent their proximal ends 14, 15 to their distal ends 16, 17) half of the outline 25 of an envelope may be marked.

Figure 6:
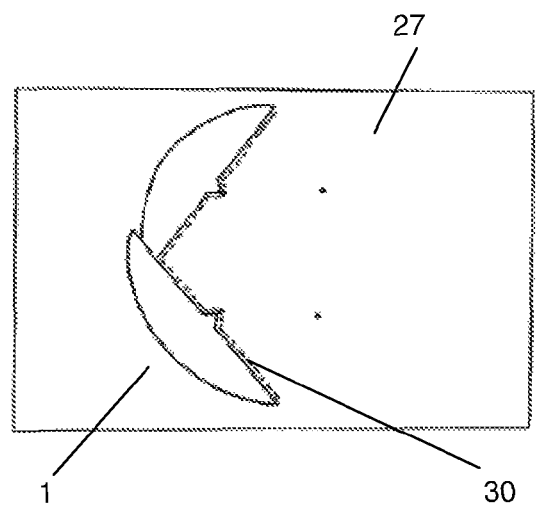
FIG. 6 is a schematic plan view of the device of FIG. 5 with a first line drawn along its tracing edge.
Figure 7:
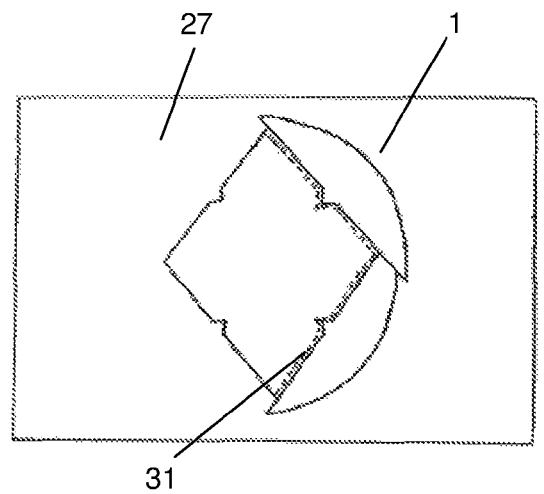
FIG. 7 is schematic plan view of the device of FIG. 5 in a second position with a second line drawn along its tracing edge.
Figure 8:
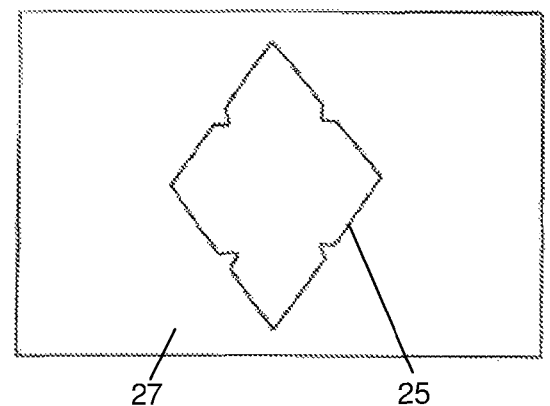
FIG. 8 is a plan view of the envelope outline resulting from the actions depicted in FIGS. 4 to 7.

Turning to FIG. 6 it can be seen that the same marking procedure is adopted with the second pair of corner markings 28.

Envelope-outlining device 1 is flipped over or rotated and positioned with vertices 24, 29 of protrusions located on a second pair of corner markings 28.

Evidently there is no need for further adjustment of the relative positions of the tracing member 2, 3 owing to them being secured relative to each other by nut and bolt assembly 4.

By again tracing the full length of tracing edges 11, 12 (i.e. from where respective tracing edges 11, 12 meet adjacent their proximal ends 14, 15 to their distal ends 16, 17) the second half 31 of the outline 25 of an envelope may be marked.

The envelope may then be cut from material 27 by any suitable implement, such as a knife or scissors.

It can be seen that the vertices 24, 29 of the protrusion 18, 19 are adapted to be positioned at the corners of an outline of an envelope when the envelope-outlining device 1 is in use. Indeed the device is adapted such that when in use protrusions 18, 19 may be positioned at a first pair of corner markings and a first half of an envelope outline may be marked, and the protrusions 18, 19 may be positioned at a second pair of corner markings and a second half of an envelope outline may be marked.

As can be clearly seen from the drawings, protrusions 18, 19 are adapted such that when the device has been used protrusions 18, 19 provide that the resultant envelope outline embodies flaps that overlap each other when folded.

It will be apparent that a device made in accordance with the present invention could be made of any suitable material, such as a plastics material. Preferably each tracing member would be molded in one piece.

Although in the present embodiment a nut and bolt connector is used it will be apparent that any suitable connection means may be employed. Indeed a connector that does not protrude from the base of the device may be preferable such that the device may lay entirely flat on a surface.

Although in the present embodiment the tracing members are semi-elliptical in shape it will be apparent that other shapes could of course be employed.

Many variations are possible without departing from the scope of the invention, as set out in the appended claims.

The invention claimed is:

1. An envelope-outlining device comprising first and second tracing members, the members being movable relative to each other, and wherein each tracing member has a respective tracing edge, and each tracing edge has:
   a proximal end and a distal end; and
   a protrusion extending from the tracing edge at a point approximately midway between the proximal and distal ends.

2. The device of claim 1 wherein the tracing edges are substantially linear.

3. The device of claim 1 wherein the first and second tracing members are pivotally attached to each other.

4. The device of claim 1 wherein the first and second tracing members are slidably attached to each other.

5. The device of claim 1 further comprising means to releasably secure the tracing members in a fixed position relative to each other.

6. The device of claim 1 wherein the tracing members are substantially planar.

7. The device of claim 1 wherein each protrusion extends from the tracing edge substantially in the plane of its respective tracing member.

8. The device of claim 1 wherein a protrusion is substantially triangular in shape.

9. The device of claim 1 wherein both protrusions are substantially triangular in shape.

10. The device of claim 1 wherein the means to releasably secure the tracing members in a fixed position relative to each other comprises a slot formed in at least one tracing member and a connecting member adapted to pass through the slot.

11. The device of claim 10 wherein the slot is arcuate.

12. The device of claim 10 wherein the slot extends along at least a third of the length of the tracing member.

13. The device of claim 10 wherein the slot extends along around half the length of the tracing member.

14. The device of claim 10 wherein both tracing members comprise a slot.

15. The device of claim 10 wherein both slots are arcuate.

16. A method of marking an outline of an envelope comprising the steps of:
   a. marking on a sheet of material two pairs of corner markings corresponding to the four corners of a rectangular or square item to be contained in the envelope;
   b. providing an envelope-outlining device comprising first and second tracing members, means to releasably secure the tracing members in a fixed position relative to each other, wherein each tracing member has a respective tracing edge, and each tracing edge has a protrusion extending from the tracing edge;
   c. adjusting the position of the envelope outlining device such that the protrusions are positioned at a first pair of corner markings;
   d. drawing along the tracing edges part of an outline of the envelope.

17. The method of claim 16 further comprising the steps of:
   a. adjusting the envelope outlining device such that the protrusions lie adjacent to a second pair of corner markings;
   b. drawing along the tracing edges a further part of an outline of the envelope.

* * * * *